Figure 4:
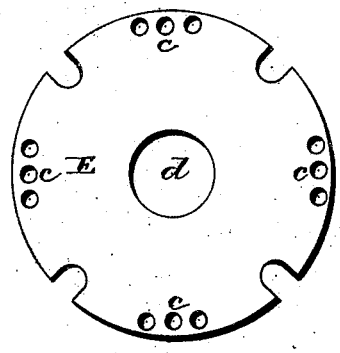

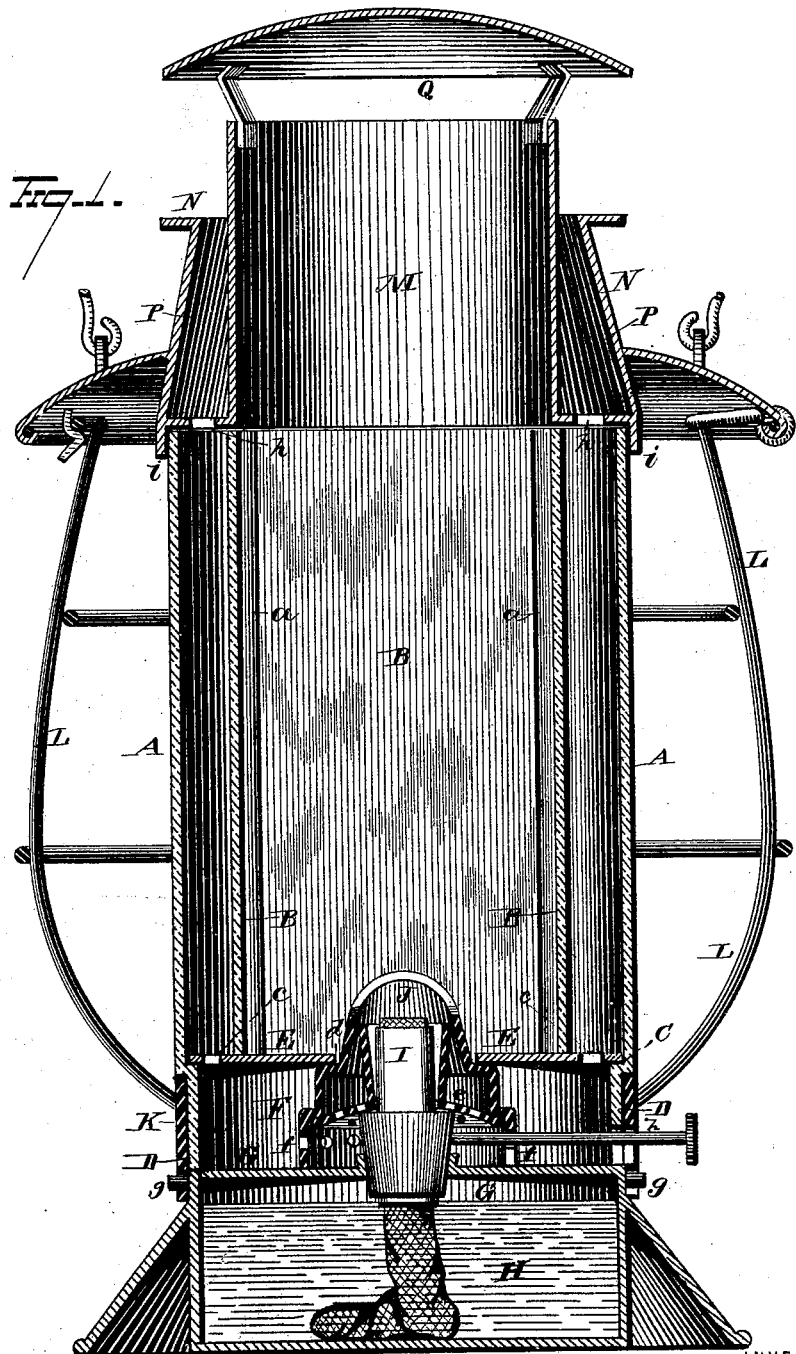

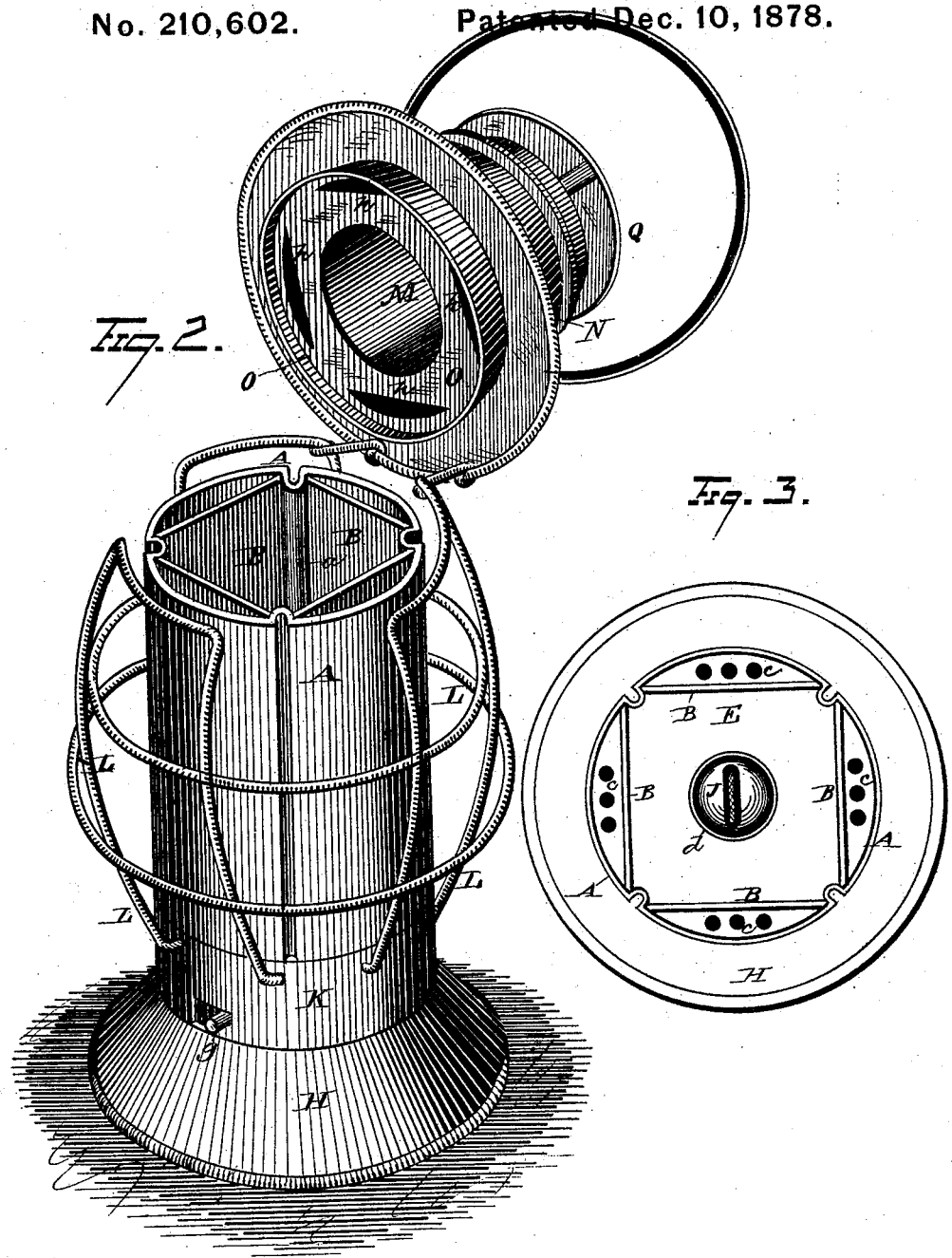

4 Sheets—Sheet 3.

J. H. EWING & E. L. BILL.
Lantern and Lamp.

No. 210,602. Patented Dec. 10, 1878.

WITNESSES
E. J. Nottingham
G. Dudley Seymour

INVENTOR
John H. Ewing.
Edward L. Bill.
By H. A. Seymour. ATTORNEY

4 Sheets—Sheet 4.
J. H. EWING & E. L. BILL.
Lantern and Lamp.
No. 210,602. Patented Dec. 10, 1878.
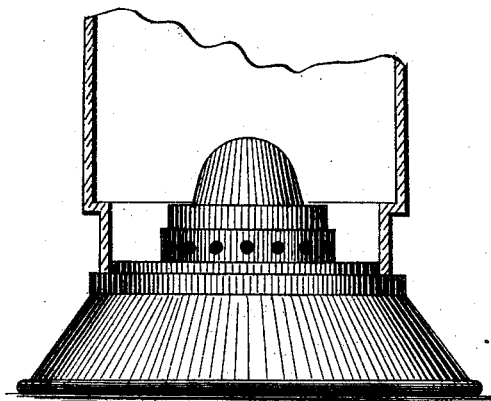
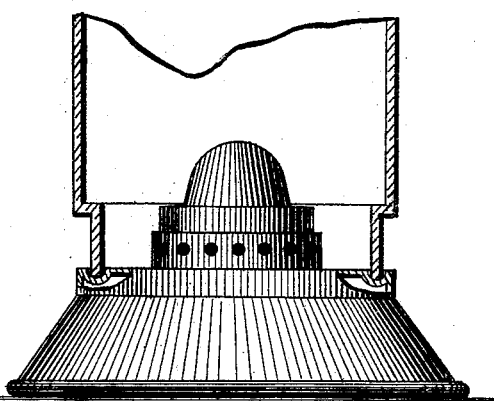
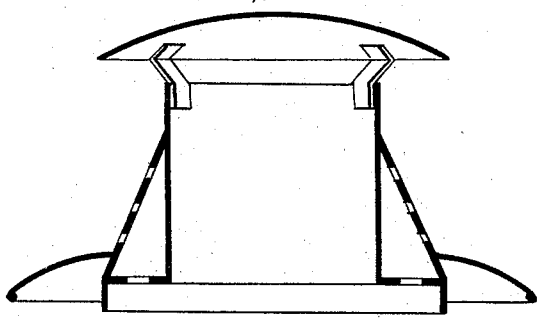
WITNESSES
INVENTORS

UNITED STATES PATENT OFFICE.

JOHN H. EWING AND EDWARD L. BILL, OF WHEELING, WEST VIRGINIA.

IMPROVEMENT IN LANTERNS AND LAMPS.

Specification forming part of Letters Patent No. 210,602, dated December 10, 1878; application filed November 11, 1878.

*To all whom it may concern:*

Be it known that we, JOHN H. EWING and EDWARD L. BILL, of Wheeling, in the county of Ohio and State of West Virginia, have invented certain new and useful Improvements in Lanterns and Lamps; and we do hereby declare the following to be a full, clear, and exact description of the invention, such as will enable others skilled in the art to which it pertains to make and use it, reference being had to the accompanying drawings, which form part of this specification.

Our invention relates to an improvement in lanterns and lamps, the object being to provide a lantern or lamp with an air-chamber above the oil-receptacle and below the burner, and supply air to the burner solely and directly from said air-chamber.

A further object of our invention is to simplify the construction of lanterns and provide for a regular and steady flame at all times, regardless of the varying drafts and positions to which the lantern may be subjected while in actual use.

To these ends our invention consists, first, in a lamp or lantern provided with an air-chamber located over the oil cup or receptacle and below the upper end of the burner, the cone of the latter provided with perforations around its lower end and within said air-chamber, whereby the outer air supplied to said air-chamber is all directed and conveyed to the point of combustion through the cone of the burner.

Our invention further consists in a lantern having an air-chamber located over the oil-cup and below the upper end of the burner, the lower end of the globe constituting the cylinder or casing of said air-chamber.

Our invention further consists in the combination, with a globe provided with removable slides, arranged to constitute air-passages leading from the upper to the lower portion of the globe, of a plate having marginal openings or air-passages, a central opening for the insertion of the upper end of the burner, and an annular imperforate portion that constitutes the upper wall of an air-chamber, from which air is supplied to the cone of the burner and flows upwardly to the point of combustion.

Our invention further consists in the combination, with a globe provided with removable slides, arranged to constitute air-passages extending to the upper end of the globe, of a chimney having a collar attached to the lower end thereof by means of an annular plate provided with openings that register with the air-passages in the globe of the lantern.

Our invention further consists in other details of construction and combinations of parts, as will hereinafter appear from the following description and claims.

Figure 5:
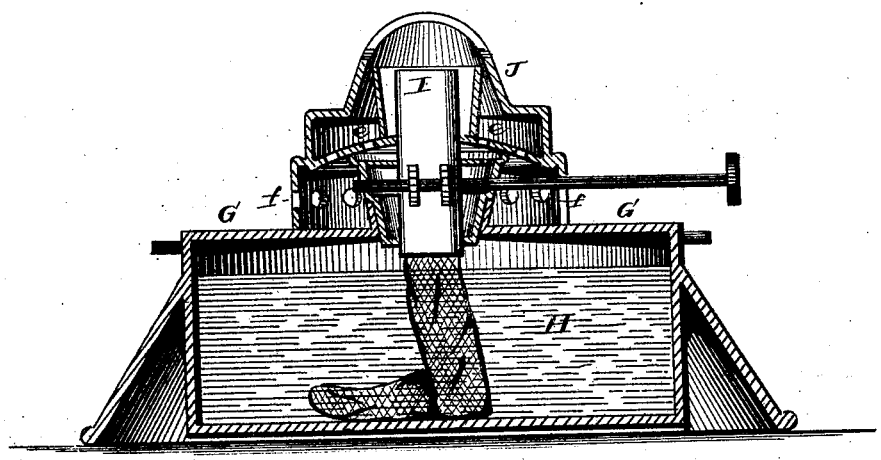

In the accompanying drawings, Figure 1 is a vertical section of our improved lantern. Fig. 2 is a view, in perspective, with the top of the lantern turned back to show the form and construction of the bottom portion of the lantern-top. Fig. 3 is a plan view, the top of the lantern being removed. Fig. 4 is a plan view of the plate which constitutes the upper wall of the air-chamber between the oil-reservoir and upper end of the burner. Fig. 5 is a vertical section of the oil-cup and burner. Figs. 6, 7, and 8 are modifications.

A represents the globe, which is either blown, molded, or pressed into the desired form. The interior of globe A is provided with any desired number of vertical ledges or flanges, $a$, which serve as guides for the removable slides or partitions B. Any desired number of slides B may be employed. If four such slides are employed, as illustrated in the drawings, four air-passages, $b$, will be formed between the globe and slides B. The lower end of globe A is formed with a shoulder or step, C, from which extends a depending flange or globe-collar, D, the particular functions of which will be hereinafter set forth.

E is a plate, the outer edge of which rests upon the shoulder or step C, and upon which rest the lower ends of the several slides or partitions B.

Instead of inserting the plate E from the upper end of the globe and thereafter securing the slides in place over said plate, the slides may rest upon the step or shoulder C, and the plate E be made of smaller diameter and inserted within the lower end of the globe, or forced up into the globe-collar D. The plate E is provided with openings $c$ at points within the air-passages $b$ of the globe, to allow air to flow from said passages through the openings $c$ into air-chamber F, which latter is formed as follows: The globe collar or flange D is of any desired width, its lower edge resting upon the top G of the oil-cup H, whereby the bottom and sides of air-chamber F are formed by the collar D and top G of the oil-cup. The upper wall of said air-chamber is formed by the plate E, the central portion of which has an opening, d, formed therein for the insertion of the upper end of the burner I, while that portion of the plate located between the burner and removable slides is imperforate, thus serving to prevent the passage of any air from the air-chamber F directly into the globe above the burner.

J is the cone of the burner, and is provided with a perforated plate, e, and a perforated depending flange, f, the latter resting upon the top of the oil-cup.

L is a guard, provided with an ordinary ring, K, to which the oil-cup is detachably secured by the bayonet-fastening g, or in any other desired manner. The step or shoulder C of the globe rests upon the upper edge of the ring K, while the globe-collar or depending flange D extends down within the ring K, and is protected from injury thereby. The globe-flange D serves to afford a firm extended bearing for the secure attachment of the globe to the ring K, and also serves to form the periphery of the air-chamber F, into which air is conducted from the several air-passages in the globe, and from thence conveyed directly into the cone of the burner, and by the latter conducted to the point of combustion. The burner is provided with ordinary ratchet adjusting mechanism, the ratchet-wire h extending through an opening in the ring K, to enable the wick to be readily adjusted without necessitating the removal of the oil-cup.

M represents a chimney, and N a collar surrounding the same, an open air-induction space being formed between the chimney and the upper end of collar N. The lower end of the collar N is of greater diameter than the lower end of the chimney M, and secured thereto by means of an annular bottom plate, O, which is provided with air-passages h, of any desired size or shape, and relatively arranged to register and communicate with the several air-passages b in the globe of the lantern.

It will be observed that an annular air-chamber, P, is formed between the collar N and chimney M, into which the air is received and allowed to flow into the air-passages in the globe, and from thence through the air-chamber F directly to the burner.

The annular bottom plate O is adapted to be seated upon the upper end of the globe and prevent the admission of air to the inner portion of the globe.

A tight joint between the globe and plate O is effected by means of a depending flange, i, formed around the outer edge of plate O, which fits over the upper edge of the globe. This flange also serves to prevent any lateral displacement of the top, and thus imparts strength to such parts.

Q is a deflector, and is attached to the central portion of the collar N, and extends outwardly over the lantern-guard. The top of the lantern may be attached to the guard by hinging the deflector thereto, or in any other convenient and practicable manner.

From the foregoing description it will be observed that the entire supply of air furnished to the burner is conveyed thereto from an air-receiving chamber surrounding the chimney, having an induction air opening or passage located above the deflector of the lantern. Air is conducted from this upper air-receiving chamber through the air-passages in the globe of the lantern to the air-chamber F, and from thence the air has no source of escape except through the burner, which latter forms a conduit for conducting the air directly to the point of combustion and consumption.

Many lanterns have heretofore been constructed where a portion of the air-supply is furnished to the interior of the cone of the burner, and another portion allowed to pass through a foraminated plate surrounding the burner and flow into the lantern-globe.

In such construction of lanterns the entire draft is not concentrated at the point of combustion, but is dispersed over the entire transverse sectional area of the globe, and hence an insufficient amount of oxygen is furnished to the burner, while an undue quantity of air is forced into the globe around the flame, which has the effect of deadening or subduing the flame, and causing it to flicker when a swinging motion is imparted to the lantern.

In our improved lantern the entire air-supply is conveyed directly to the point of combustion, the intermediate air-chamber below the burner serving to cushion the incoming streams of air, thus furnishing a steady supply of oxygen to the burner, and producing a clear white flame of great brilliancy and intensity, and which is not affected in the slightest by the variable positions of the lantern.

A distinctive feature of construction in our improved lantern consists in the location and formation of the air-chamber for supplying air to the burner. This air-chamber is formed within the lower portion of the globe instead of being formed below the lower edge of the globe, as in other lanterns. Again, the upper wall of this air-chamber being imperforate, the entire air-supply to the burner is directed toward the center of the air-chamber, and thus the top of the oil-cup and the wick-tube of the burner are kept at a low temperature, and explosions resulting from the formation of explosive gases in the oil-receptacle by undue heating of the oil are prevented.

It is evident that many slight changes in the construction and arrangement of the several features of our improvement may be resorted to without departing from the spirit of our invention, and hence we do not limit ourselves to the exact construction and arrangement of parts shown and described.

Instead of constructing the globe and oil-cup so that the lower edge of the globe-collar will rest upon the flat top of the oil-cup, the latter may be constructed with a narrow step or shoulder, which will fit within the globe-collar, as illustrated in Fig. 6; or the top of the oil-cup may have an annular groove formed therein for the reception of the lower edge of the globe-collar, as shown in Fig. 7. Again, the upper end of the collar surrounding the chimney may have an open free space between its upper end and the chimney, as illustrated in the drawings; or the upper end of said collar may be attached to the chimney, and have perforations formed in its upper portion for the ingress of air, as shown in Fig. 8.

The plate which separates the flame-chamber of the chimney or globe from the oil-receptacle and causes the entire supply of air to the point of combustion to flow through the cone of the burner, may be applied to other constructions of lanterns than that illustrated in this case, and hence we do not limit ourselves to the combination of this plate with the particular form of lamp shown and described.

Having fully described our invention, what we claim as new, and desire to secure by Letters Patent, is—

1. The combination, with an oil cup or reservoir and burner, of an air-chamber formed within the lower end of the globe or chimney, the upper wall of said air-chamber consisting of a plate interposed between the burner and globe, which operates to cut off a direct communication from said air-chamber with the flame-chamber of the globe or chimney, substantially as set forth.

2. The combination, with an oil cup or reservoir and burner, of an air-chamber located within the lower end of the globe or chimney, and between the top of said oil-cup and upper end of the burner, the upper wall of said air-chamber, between the burner and inner surface of the flame-chamber, being imperforate, and the cone of the burner perforated, whereby the air-supply to the interior of the globe is cut off except by the air-passages leading to the burner, substantially as set forth.

3. The combination, with a globe provided with air-passages within the same, of a plate provided with a central aperture for the burner and with air-passages on its outer edge that register with the air-passages in the globe, that portion of the plate located between the burner and inner walls of the globe air-passages being imperforate, substantially as set forth.

4. The combination, with a globe provided with detachable slides, arranged to form air-passages, said globe constructed with a step or shoulder on its lower end, of a removable plate located within the lower end of the globe, said plate provided with air-passages located to register with the several air-passages of the globe, substantially as set forth.

5. The combination, with a globe formed with ribs or flanges on its inner side, and independent slides or partitions secured between said ribs or flanges, to form air-passages, of a removable plate supported upon a collar or step formed on the lower portion of the globe, said plate serving to support the slides and intercept the passage of air from said air-passages to the interior space of the globe, substantially as set forth.

6. The combination, with an oil cup or reservoir and burner, of a globe or chimney provided with separate and independent air-passages, the lower portion of said globe extending down below the eduction ends of said air-passages and forming the periphery of an air-chamber, and an imperforate plate located between the burner and walls of the flame-chamber, for preventing the supply of air from flowing directly into the flame-chamber of the globe or chimney from said air-chamber, substantially as set forth.

7. The combination, with a lantern-guard, its ring, and an oil-cup adapted to be detachably secured to the guard-ring, of a globe having interior air-passages, the lower end of the globe extending down to form the periphery of an air-chamber, and a plate located within the globe, serving to form the upper wall of said air-chamber, substantially as set forth.

8. The combination, with the chimney of a lantern, of a collar surrounding the same, to form an intervening air-space, and connected with the chimney by a bottom plate having openings that register with air-passages in the globe of the lantern, substantially as set forth.

9. The combination, with the chimney of a lantern, of a collar surrounding the same, and adapted to form an intervening air-chamber, and a bottom plate connecting the chimney and collar, said plate provided with air-openings that register with air-passages in the globe, the outer edge of said plate provided with a depending flange that fits over the upper edges of the globe, substantially as set forth.

10. The combination, with a globe provided with one or more interior air-passages, of a chimney of smaller diameter than the upper end of the flame-chamber of the globe, said chimney constructed with an annular air-chamber, which is located, in part, directly over the interior space or flame-chamber of the globe, substantially as set forth.

11. The combination, with a globe provided with interior air-passages, of a chimney having a collar secured thereto by a bottom plate furnished with openings that register with the air-passages in the globe, and a deflector secured to said surrounding collar, substantially as set forth.

12. In a lantern or lamp, an air-chamber located below the burner and provided with a close periphery, and air-induction passages that connect with air-passages leading to the upper portion of the lantern or lamp, in combination with a plate interposed between the oil-receptacle and globe or chimney, said plate being imperforate between the walls of the flame-chamber and burner, and serving to cause air entering beneath the same to be conducted to the flame-chamber of the globe or chimney through the cone of the burner, substantially as set forth.

In testimony that we claim the foregoing we have hereunto set our hands this 8th day of November, 1878.

JOHN H. EWING.
EDWARD L. BILL.

Witnesses:
WM. A. CRACRAFT,
W. P. ADAMS.